INVENTOR.
LAWRENCE G. WILEY

BY

Curtis, Morris & Safford

April 18, 1967 L. G. WILEY 3,315,092

DRIVER CIRCUIT FOR MAGNETIC CORE DEVICE EMPLOYING ADDITIONAL CHARGE PATH FOR CONTROLLED YET RAPID RECYCLING THEREOF

Filed Dec. 20, 1963

3 Sheets-Sheet 2

INVENTOR.
LAWRENCE G. WILEY
BY
Curtis, Morris & Safford

April 18, 1967 L. G. WILEY 3,315,092

DRIVER CIRCUIT FOR MAGNETIC CORE DEVICE EMPLOYING ADDITIONAL CHARGE PATH FOR CONTROLLED YET RAPID RECYCLING THEREOF

Filed Dec. 20, 1963

3 Sheets-Sheet 3

INVENTOR.
LAWRENCE G. WILEY
BY
Curtis, Morris & Safford 3,315,092

DRIVER CIRCUIT FOR MAGNETIC CORE DEVICE EMPLOYING ADDITIONAL CHARGE PATH FOR CONTROLLED YET RAPID RECYCLING THEREOF

Lawrence Grebe Wiley, Camp Hill, Pa., assignor to AMP Incorporated, Harrisburg, Pa.

Filed Dec. 20, 1963, Ser. No. 331,999
15 Claims. (Cl. 307—88.5)

This invention relates to an improved driver circuit for magnetic core shift registers and the like.

An object of this invention is to provide an improved drive circuits for operating magnetic core devices, such as shift registers, at high speeds.

Another object is to provide such a drive circuit which is very reliable, which is easy to control, and which is relatively simple and inexpensive.

A more specific object is to provide a drive circuit for energizing at high speed a magnetic core shift register using multi-aperture cores.

In a multi-aperture (MAD) core shift register, such as shown in U.S. Patent No. 2,995,731, transfer of information from one core in the register to the next is accomplished by driving the one core with a properly shaped "advance" current which returns the core to "clear" condition and simultaneously causes the transfer of the information stored in this core to the next core. Thereafter, the latter core is "cleared" by a second advance current, and so on. Between the advance currents applied to the cores there is also applied a "prime" current which, so to speak, conditions each given core in the register so that thereafter upon the occurrence of an advance current, information can be transferred to the next core. The construction and operation of such a shift register is explained in detail in the aforesaid patent.

Now, one of the problems with a shift register of this kind is how to apply to the various cores, currents of proper amplitude and shape to effect the required shifting operation. This problem becomes particularly difficult at very high speeds of operation. The present invention provides an improved supply unit particularly suitable for a magnetic core device of this kind. This new driver unit can be operated at high speed, yet it uses only solid state devices (i.e., no vacuum tubes) and it is extremely reliable in operation over a large temperature range.

Heretofore, four-layer diodes have been employed to controllably switch the charging and discharging of a single capacitor through a pulse-forming network to form distinct output pulses. The circuit of this prior approach has proven highly successful in that it is less expensive and more reliable than prior known circuits of the same capability. However, one drawback of this circuit arrangement has been that when the capacitor discharges through one four-layer diode, the capacitor recharges too rapidly causing the other four-layer diode to operate too fast which provides switching voltages out of sequence with a device utilizing the switching voltages such as, for example, a shift register.

In accordance with the present invention in one specific embodiment thereof, a single capacitor is arranged to be charged from a source of supply. The charging of the capacitor is controlled by a solid state member. Thereafter, the charge which has accumulated in the capacitor is discharged on command through a four-layer diode switch through an advance winding of the shift register, and after being recharged is then discharged on command through another similar four-layer diode switch through another advance winding of the shift register to provide proper sequencing to the advance circuits. The cores of the register during and between the advance currents are supplied by a continuous prime current which does not interfere with the advance currents and which nonetheless provides the necessary priming current. This cycle of charging and discharging of the capacitor to provide the advance currents can be carried out at high speed, and since the second advance current is not dependent upon the first advance current, a high degree of proper sequence and fail-safe operation is achieved. Moreover, the parts required for this new driver are relatively few and inexpensive.

Other objects and attainments of the present invention will become apparent to those skilled in the art upon a reading of the following detailed description when taken in conjunction with the drawings in which there is shown and described illustrative embodiments of the invention; it is to be understood, however, that this embodiment is not intended to be exhaustive nor limiting of the invention but is given for purposes of illustration in the invention and principles thereof and the manner of applying it in practical use so that they may modify it in various forms, each as may be best suited to the conditions of a particular use.

Figure 1:
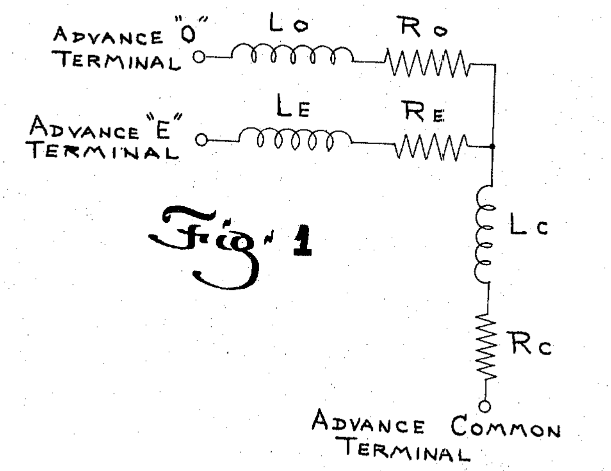
FIGURE 1 is a schematic representation of the drive requirement for a MAD shift register.

From a drive requirement standpoint, a MAD core arrangement is represented schematically as shown in FIGURE 1 and comprises windings $L_O$ and $L_E$ connected in series with respective resistance $R_O$ and $R_E$ which, in turn, are serially connected to a common inductance $L_c$ and resistance $R_c$ in series relationship.

Figure 2:
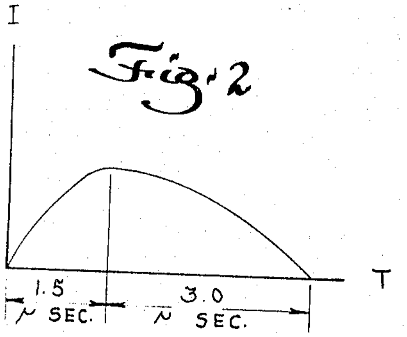
FIGURE 2 is a graphic representation of a current wave shape for the embodiment of FIGURE 1.

Proper operation requires that current pulses be successively applied through the ADVANCE "O" to ADVANCE COMMON and ADVANCE "E" to ADVANCE COMMON terminals. It has been determined that the wave shape of these two current pulses should each be as illustrated in FIGURE 2. The required peak current amplitude varies from one MAD core arrangement to another depending on the core size and method of wiring, but normally will be between 1.5 and 5.0 amperes, with a time of 1.5 microseconds from zero current to peak current and a time of 3 microseconds from peak current to zero current.

Figure 3:
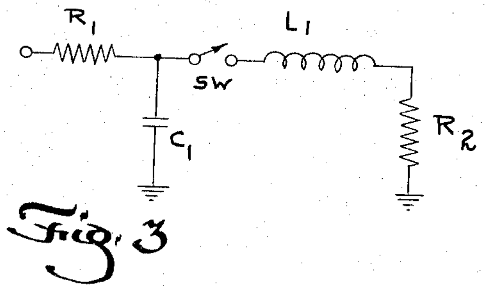
FIGURE 3 is a schematic representation similar to FIGURE 1 showing the drive circuit to one advance winding of a shift register.

Current pulses of the required wave shape and amplitude may be generated by discharging a capacitor through a series connected inductance and resistance as shown in FIGURE 3. Capacitor $C_1$ charges through resistor $R_1$ to a voltage equal to the supply voltage $E_s$. When switch SW is closed, capacitor $C_1$ discharges through inductor $L_1$ and resistor $R_2$. The discharge current pulse may be made to have the desired wave shape and amplitude by proper selection of $C_1$, $L_1$, and $R_2$. When switch SW is opened, capacitor $C_1$ recharges through resistor $R_1$.

Figure 4:
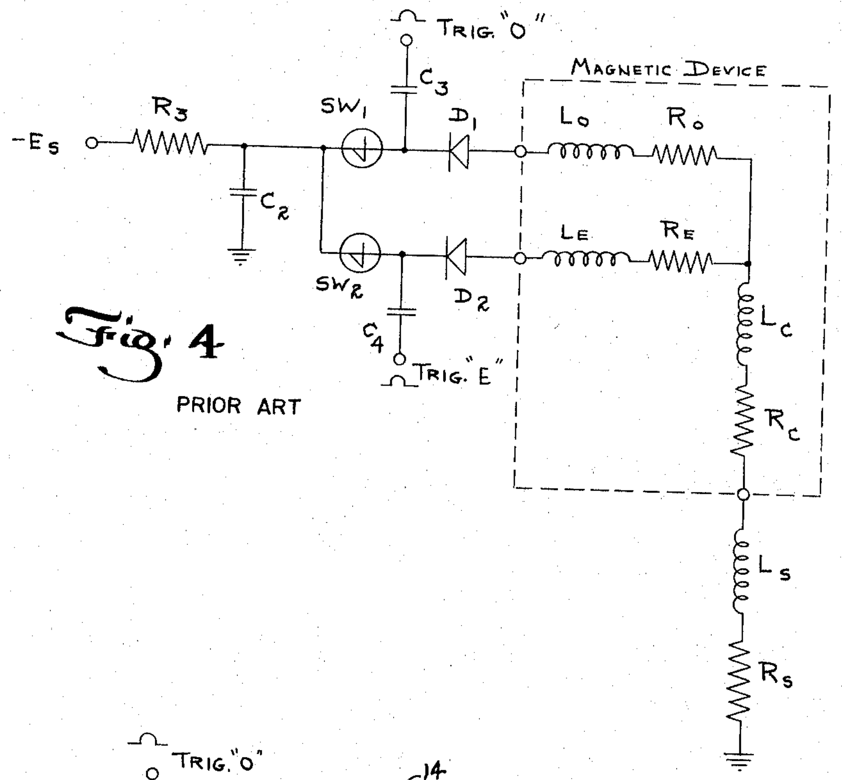
FIGURE 4 is a schematic circuit diagram of a conventional drive circuit for the advance windings of a shift register.

A practical and conventional circuit for generating the required pulses by this method is shown in FIGURE 4. If this circuit is connected to a voltage source, $-E_s$, capacitor $C_2$ will charge to a voltage equal to $-E_s$ through resistor $R_3$. Application of a positive voltage pulse to the TRIG. "O" terminal will turn the four-layer diode $SW_1$ on through capacitor $C_3$. Capacitor $C_2$ now discharges through $SW_1$, $D_1$, $L_0$, $R_0$, $L_c$, $R_c$, $L_s$ and $R_s$. The purpose of diode $D_1$ is to prevent the positive trigger pulse from being shorted to ground through $L_0$, $R_0$, $L_c$, $R_c$, $L_s$, and $R_s$. Because the discharge circuit contains inductance, capacitor $C_2$ will charge to a small voltage opposite in polarity to $-E_s$. This voltage will back bias the four-layer diode $SW_1$, and, if maintained (5 to 10 microseconds) will allow $SW_1$ to return to its off or non-conducting state. Capacitor $C_2$ will then recharge through resistor $R_3$.

Application of a positive voltage pulse to the TRIG. "E" terminal through capacitor $C_4$ will discharge capacitor $C_2$ through $SW_2$, $D_2$, $L_E$, $R_E$, $L_c$, $R_c$, $L_s$ and $R_s$ as above. Values of $-E_s$, $C_2$, $L_s$ and $R_s$ may be selected to generate the required current wave shape and amplitude. A more complete explanation of four-layer diodes as solid state switches can be found in Ser. No. 156,616, filed Dec. 4, 1961, now U.S. Patent No. 3,154,694 under the present inventor's name.

Figure 5:
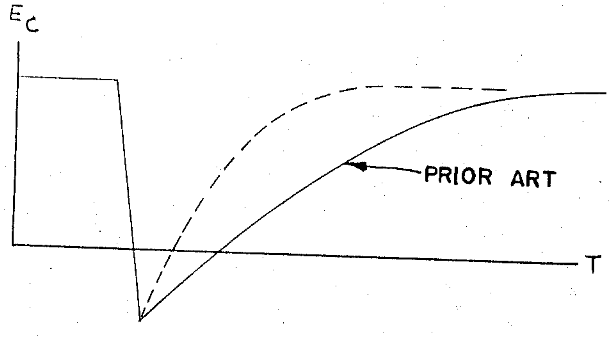
FIGURE 5 is a voltage time curve of the charging capacitor used in the circuit of FIGURE 4.

The circuit of FIGURE 4 has been used successfully in numerous applications over an extended period. However, it does suffer several limitations. One of the most serious is that the maximum speed of operation is limited to about 1000 cycles per second. Operating speed is determined by the product $R_3C_2$, the speed being inversely proportional to this product. As explained above, capacitor $C_2$ must be maintained in a reverse charge condition long enough for the "on" four-layer diode, $SW_1$ or $SW_2$, to recover to its off condition. As shown in FIGURE 5, the nonbroken line illustrates the rate of discharge and recharge of capacitor $C_2$ with resistor $R_3$ at a high value which provides that capacitor $C_2$ remain in a state of reverse charge long enough to allow $SW_1$ or $SW_2$ to recover. If $R_3$ is made too low in value, as indicated by the broken line, capacitor $C_2$ will not remain in a reverse charge state long enough to allow $SW_1$ or $SW_2$, to recover. The result is that the "on" four-layer diode, $SW_1$ or $SW_2$, remains on and capacitor $C_2$ cannot properly recharge. This factor determines the minimum value of $R_3$ and thus the maximum operating frequency.

Figure 6:
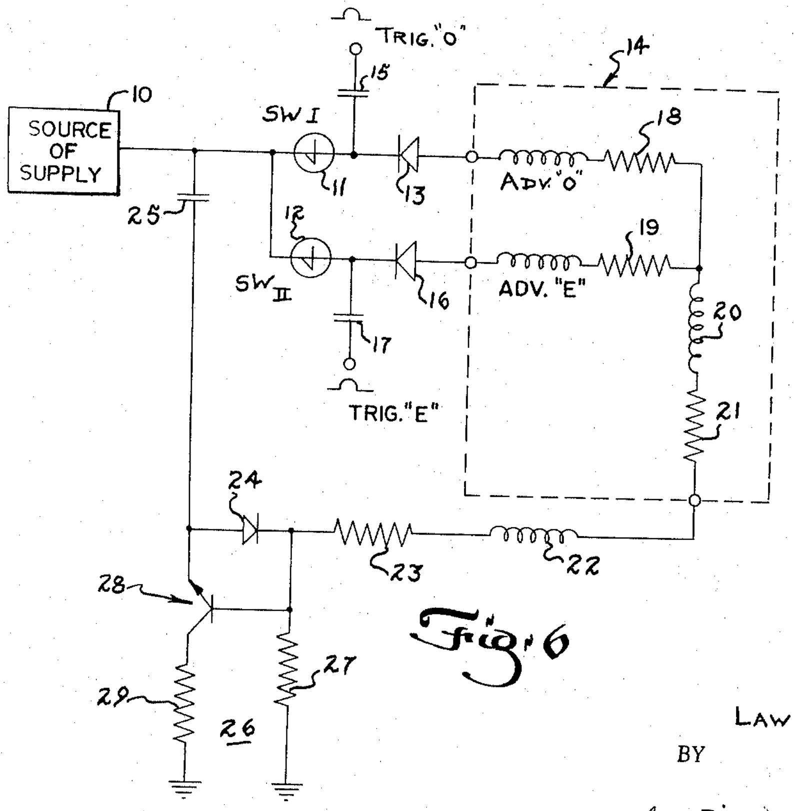
FIGURE 6 is a schematic diagram of the circuit of the invention.

Turning now to FIGURE 6, there is shown the circuit arrangement of the present invention. A suitable source of voltage is denoted at 10 which is connected to four-layer diodes 11 and 12 acting as solid state switches $SW_I$ and $SW_{II}$, respectively. Four-layer diode 11 is serially connected to diode 13 and an ADV. "O" winding of shift register 14. A positive TRIG. "O" voltage pulse from a conventional trigger circuit (not shown) is applied between four-layer diode 11 and diode 13 through a capacitor 15.

Four-layer diode 12 is also serially connected to diode 16 and an ADV. "E" winding of shift register 14. A positive TRIG. "E" voltage pulse from the trigger circuit is applied between four-layer diode 12 and diode 16, through a capacitor 17.

Each ADV. "O" and ADV. "E" winding is serially connected to a respective resistor 18, 19, and these, in turn, are connected in series with inductance 20, resistor 21, inductance 22, resistor 23, diode 24 and capacitor 25. The other end of capacitor 25 is connected between voltage source 10 and four-layer diodes 11, 12.

A control circuit 26 is connected in shunt with diode 24 for controlling the recharging rate of capacitor 25. Control circuit 26 includes a resistor 27 connected between ground and the cathode of diode 24. The emitter of a transistor 28 is connected to the anode of diode 24 while the collector thereof is connected through resistor 29 to ground. The base of transistor 28 is connected between the cathode of diode 24 and resistor 27.

No priming circuit arrangement or other circuit arrangements conventional in shift registers have been shown in register 14 as these are not considered essential to the understanding of the present invention.

Operation of the circuit of FIGURE 6 is as follows: When the circuit is connected to source of voltage 10, capacitor 25 charges through transistor 28 and resistor 29. The base current of transistor 28 is supplied through resistor 27. Application of a positive voltage pulse to the TRIG. "O" terminal will turn four-layer diode 11 which is switch $SW_I$ on. Capacitor 25 will then discharge through $SW_I$, diode 13, ADV. "O" winding, resistor 18, inductance 20, resistor 21, inductance 22, resistor 23 and diode 24. This is indicated at 30 in FIGURE 7.

Discharge current from capacitor 25 produces a voltage drop across diode 24 which back biases transistor 28 and turns it to an off or non-conducting condition. As stated in conjunction with FIGURES 4 and 5, capacitor 25 will charge in a reverse manner to provide a small reverse voltage as indicated at 31 in FIGURE 7, thus back-biasing $SW_I$.

Figure 7:
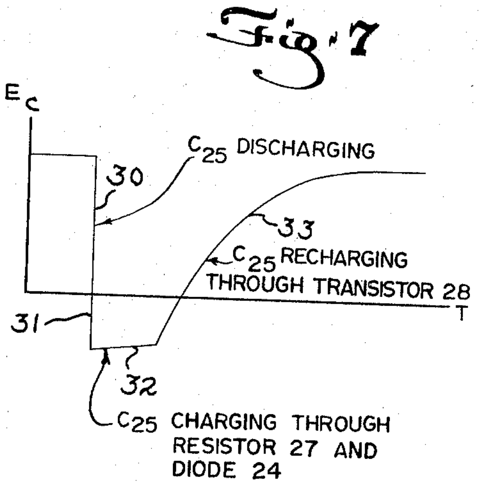
FIGURE 7 is a voltage time curve of the charging capacitor used in the circuit of FIGURE 6.

Due to the fact that transistor 28 is in a non-conducting condition, capacitor 25 starts to recharge through resistor 27 and diode 24 as indicated at 32 in FIGURE 7. This will continue until diode 24 can recover to its off condition.

Diode 24 is selected to have a long recovery time and resistor 27 has a large ohmic value which is large enough to prevent continuous conduction of four-layer diode 11. As soon as diode 24 recovers, i.e., turns off, back bias is no longer applied to transistor 28 which now turns on to its conduction state and capacitor 25 now recharges through transistor 28 and resistor 29 as indicated at 33 in FIGURE 7. Resistor 29 may be made small for fast recharging of capacitor 25 since transistor 28 has been held off long enough to permit $SW_I$ to recover to its non-conduction state. The same operation as outlined above occurs when a positive voltage pulse is applied to terminal TRIG. "E" to operate $SW_{II}$.

As has been discerned, there has been described a novel circuit arrangement to provide a high degree of proper sequence and fail-safe operation to a load device, such as, for example, a shift register.

Figure 8:
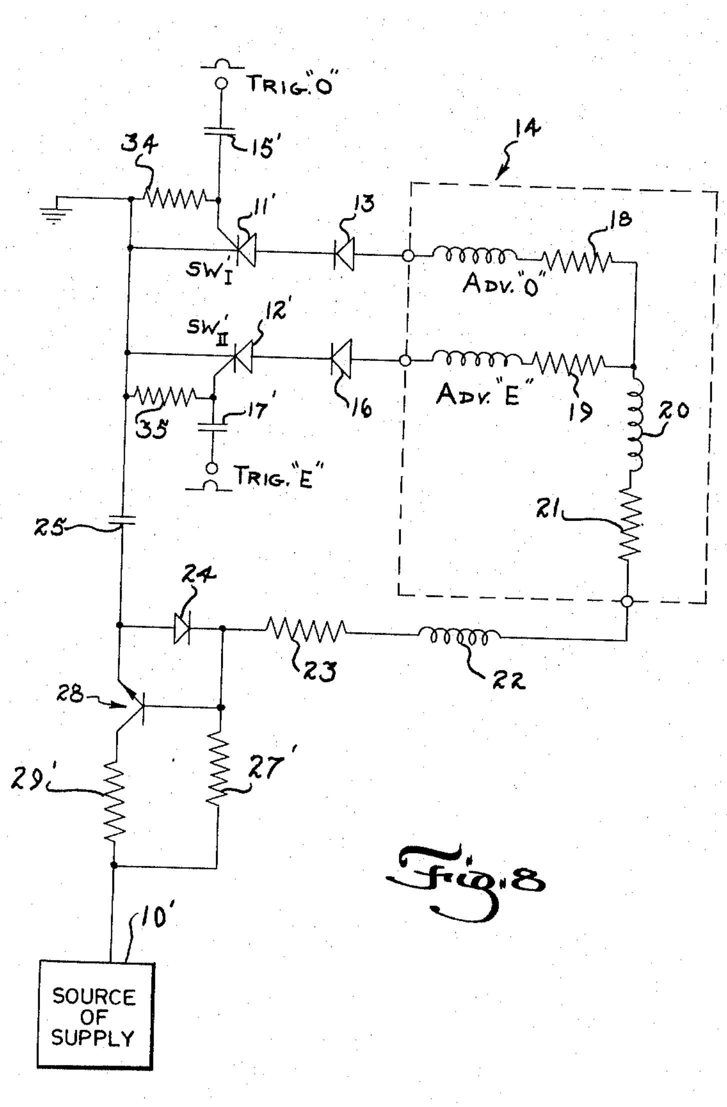
FIGURE 8 is an alternative embodiment of the circuit of FIGURE 6.

While the present invention has been described in conjunction with four-layer diodes, it is to be understood that other solid state switching semi-conductors, such as, for example, of the silicon controlled rectifier type, can be used in place of the four-layer diodes. Such an arrangement is illustrated in FIGURE 8 wherein the four-layer diodes are replaced by SCR's 11′ and 12′ and are accordingly switches $SW'_I$ and $SW'_{II}$, respectively. The cathodes of SCR's 11′ and 12′ are connected to ground while the gates thereof are connected to ground through resistors 34 and 35, respectively. A positive TRIG. "O" and TRIG. "E" voltage pulse is connected to the gates of SCR's 11′ and 12′ through capacitors 15′ and 17′, respectively. Voltage source 10′ is connected to resistors 27′ and 29′. Otherwise, the rest of the circuit of FIGURE 8 is similar to that of FIGURE 6 and need not be further explained.

It will, therefore, be appreciated that the aforementioned and other desirable objects have been achieved; however, it should be emphasized that the particular embodiments of the invention, which are shown and described herein, are intended as merely illustrative and not as restrictive of the invention.

I claim:

1. An electronic circuit comprising solid state switch means connected to be driven to conduction to operate load means, an input for applying a constant voltage to said switch means, means in circuit with said switch means and responsive to conduction of said switch means to produce output pulses to said load means, and means connected to said last mentioned means to provide rapid recycling of said last mentioned means at a predetermined rate including means to alter said rate to provide proper sequential conduction of said switching means.

2. An electronic circuit according to claim 1 wherein said output pulse producing means includes a capacitor.

3. An electronic circuit according to claim 1 wherein said switch means are four-layer diodes.

4. An electronic circuit according to claim 1 wherein said switch means are silicon controlled rectifiers.

5. An electronic circuit according to claim 1 wherein said means to provide rapid recycling includes a transistor means and resistance means connected to a back-biasing means.

6. An electronic circuit according to claim 5 wherein said resistance means includes a relatively high resistance to provide back-biasing through said back-biasing means to said transistor means until recovery of said transistor means and a relatively low resistance to provide recovery of said switch means.

7. A pulse generator comprising a first and second solid state switching means, a source of constant voltage connected to said switching means, triggering pulse source means connected to each switching means, a capacitor connected to be discharged by the conduction of each switching means, pulse forming network means including said capacitor connected to output terminal means, the charging and discharging of said capacitor producing output pulses at said output terminal means, means for recharging said pulse forming network means at a predetermined rate, and means connected to said recharging means to alter the recharging rate of said pulse forming network means to provide proper sequential conduction of said switching means.

8. A pulse generator according to claim 7 wherein said solid state switching means comprises four-layer diode means.

9. A pulse generator according to claim 7 wherein said solid state switching means comprises silicon controlled rectifier means.

10. A pulse generator according to claim 7 wherein said recharging means includes transistor means connected to said capacitor including resistance means, and said altering means includes back-biasing means to provide conduction and nonconduction of said transistc means.

11. A power supply to energize with short curren pulses alternate ones of inductive windings of a magneti core shift register and the like comprising a constant volt age source, a first switch means to be triggered on by : voltage, first means including a blocking diode and a ca pacitor for connecting said first switch means to one of the inductive windings in a pulse forming circuit, a seconc switch means to be triggered on by a voltage, second means including another blocking diode and said capacitor for connecting said second switch means to another of said inductive windings in another pulse forming circuit, means for recharging said pulse forming circuits at a predetermined rate, and means connected to said recharging means to alter recharging of said capacitor for conduction of said switch means to provide proper sequential operation of said switch means.

12. A power supply according to claim 11 wherein said altering means includes a first circuit means providing high impedance to provide slow recharging of said capacitor for a period of time and a second circuit means providing low impedance to rapidly recharge said capacitor.

13. A power supply according to claim 12 wherein said first circuit means includes a semiconductor means, resistance means and back-biasing means connected to said semiconductor means, said second circuit means includes said semiconductor means and another resistance means connected to said semi-conductor means.

14. A power supply according to claim 11 wherein said switch means are four-layer diodes.

15. A power supply according to claim 11 wherein said switch means are silicon controlled rectifiers.

References Cited by the Examiner

UNITED STATES PATENTS

| | | | |
|---|---|---|---|
| 3,053,999 | 9/1962 | Baudin | 307—88.5 |
| 3,191,060 | 6/1965 | Mahoney | 307—88.5 |

ARTHUR GAUSS, *Primary Examiner.*

J. S. HEYMAN, *Assistant Examiner.*